Sept. 23, 1969  G. E. MATHER  3,468,527
COIL SPRING
Filed March 8, 1968  5 Sheets-Sheet 1
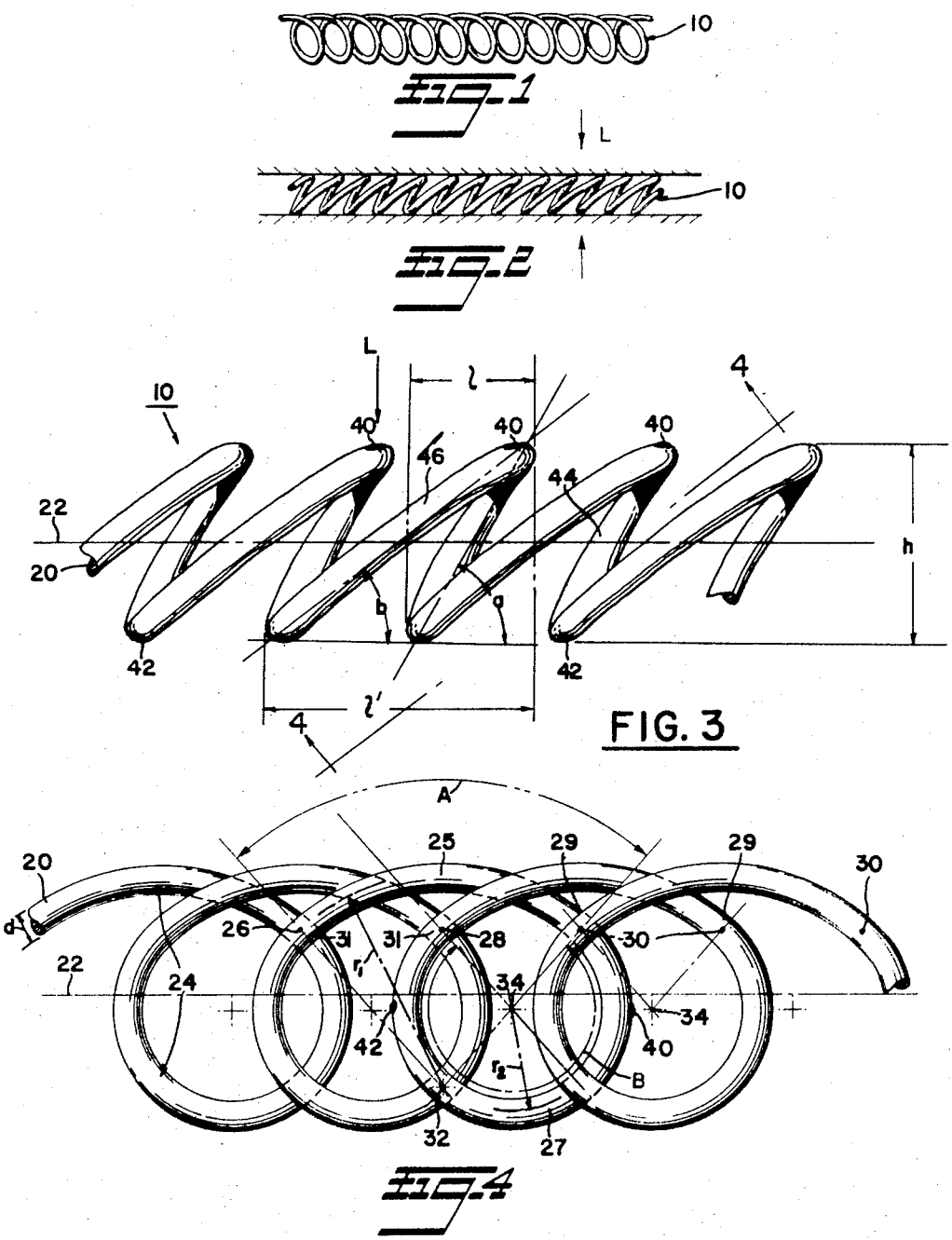
INVENTOR
Glenn E. Mather

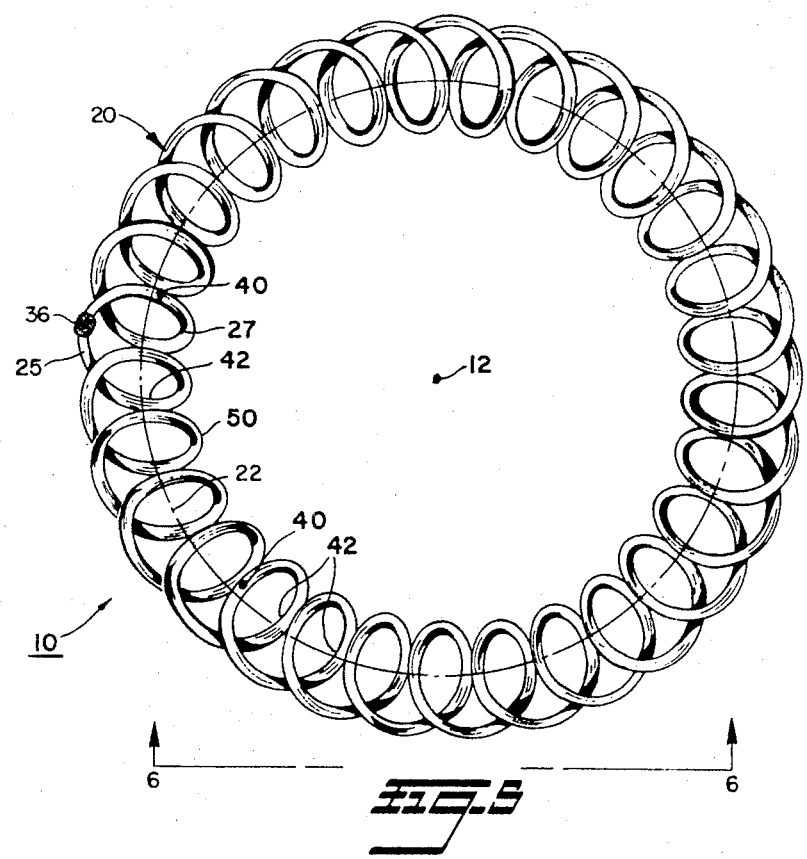
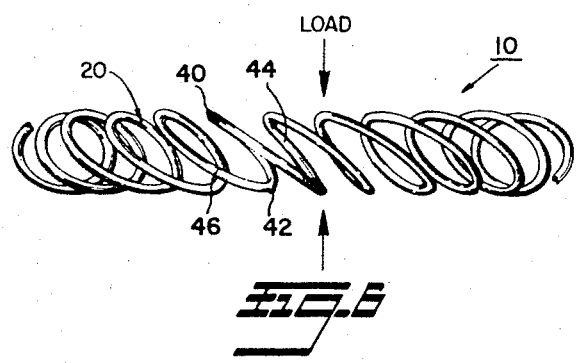

Sept. 23, 1969  G. E. MATHER  3,468,527
COIL SPRING
Filed March 8, 1968  5 Sheets-Sheet 3
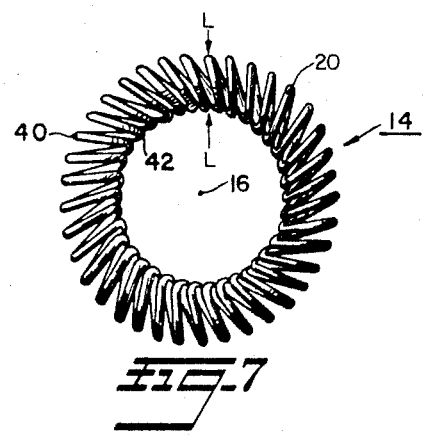
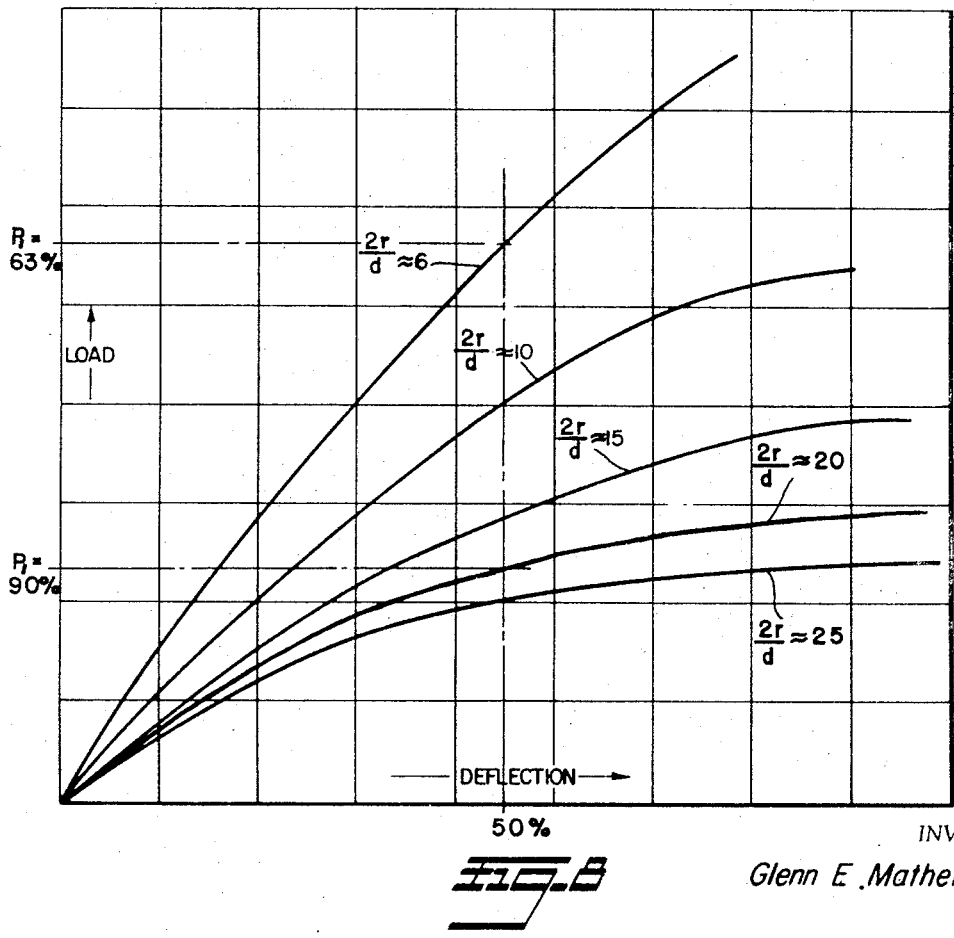
INVENTOR
Glenn E. Mather United States Patent Office 3,468,527
Patented Sept. 23, 1969

3,468,527
COIL SPRING
Glenn E. Mather, Logansport, Ind., assignor to North American Rockwell Corporation, Pittsburgh, Pa., a corporation of Delaware
Filed Mar. 8, 1968, Ser. No. 711,774
Int. Cl. F16f 1/06, 1/34
U.S. Cl. 267—1                                                12 Claims

ABSTRACT OF THE DISCLOSURE

A continuous coil spring for loading in a predetermined direction transverse to its coiled axis, each coil of the spring having portions formed on different constant radii and joined by relatively short transition portions. Alternate portions of the spring are disposed at profile angles which are fixed independently of the spring index. A broad range of load-deflection characteristics, including a substantially constant load characteristic, can be attained with a high degree of predictability by accurately forming the constant radii portions and selecting the spring index in accordance with this invention. The spring, when in annular form, may be arranged to be loaded axially or radially with respect to its annular axis.

RELATED APPLICATIONS AND PATENT

This application is a continuation-in-part of copending patent application Ser. No. 690,485, entitled "Springs," filed on Dec. 14, 1967, now abandoned, in the name of the present applicant and assigned to the present assignee.

This invention relates to and is an improvement over the coil spring disclosed and claimed in U.S. Patent No. 3,323,785, entitled "Spring," granted on June 6, 1967 to the inventor of this invention and assigned to the assignee of this invention. This copending application discloses and claims a method and machine for forming the coil springs of this invention.

DESCRIPTION OF THE INVENTION

This invention relates to coil springs for transverse loading and, more particularly, to springs having highly predictable load-deflection characteristics.

There are widespread requirements in industry for springs capable of maintaining a pair of members in spaced apart relation. In particular, it is often necessary to bias a pair of members apart so that one or both of the members will abut mating structure. Seals, valves, bearings, and clutches are typical examples of structures requiring such springs. Such structures are often of coaxial annular configuration, the springs maintaining the proper axial or radial spacing between the members. Springs utilized for this purpose must normally satisfy a number of requirements. It is ordinarily desirable that they be relatively inexpensive, possess long life without failure or deterioration, provide predictable and even pressure, successfully withstand temporary overload conditions, and automatically accommodate the effects of wear on the members. In addition, it is a requirement in most applications that the springs exhibit specific load-deflection characteristics. In some applications, it is desirable that the spring characteristics be such that force increases uniformly or linearly as the spring is deflected from its undeflected to its fully deflected positions. On the other hand, it is desirable in other applications that the load increase rapidly with initial deflection and then level off to provide substantially constant force over a broad range of deflections. This is particularly desirable in devices such as seals, bearings, clutches, and the like which are subject to wear and therefore variation in the distance between the biased-apart members, but in which it is desirable that the movable members engage the abutting structure with substantially constant force no matter what the distance is between the members. Still other spring applications require springs having load-deflection characteristics falling between these extremes.

The known prior art, including Belleville or wave washers, wide coil helical compression springs, and groups of compression springs arranged in a ring, does not satisfy all of these requirements despite the wide use of the various devices. For example, conventional coil springs for use singly or in groups are susceptible to fatigue damage and resulting breakage or variation in spring rate. Their load-deflection characteristics are also unfavorable for applications requiring constant load. The Belleville or wave washers are relatively costly since they involve relatively high tooling costs and their manufacture necessarily results in the production of substantial quantities of scrap. Coil springs formed into an annulus have also been proposed for use as retainers, seal compressors, clutch members and the like. In most prior applications of this type conventionally shaped coil springs are merely formed into a ring, examples of such construction being shown in U.S. Patent No. 262,557 issued to R. H. Barnard on Aug. 15, 1882; U.S. Patent No. 1,538,670 issued to J. W. Stanley on May 19, 1925; U.S. Patent No. 1,939,-790 issued to F. A. Prahl on Dec. 19, 1933; U.S. Patent No. 2,255,217 issued to H. C. Hill on Sept. 9, 1941; and U.S. Patent No. 3,199,833 issued to R. L. Skinner, Sr. on Aug. 10, 1965. In other proposals the coil springs, after being conventionally formed, may be deformed during assembly so that the planes of their individual coils will be further inclined at an angle to the axis of the spring to preload the spring to permit the coils to exert a radial or axial force since the forcibly inclined coils tend to assume their original more upright position. Examples of this type of construction are disclosed in U.S. Patent No. 1,911,276 issued to E. P. Harley on May 30, 1933; U.S. Patent No. 3,053,543 issued to I. N. Kallin on Sept. 11, 1962; and U.S. Patent No. 3,061,060 issued to H. F. Stephenson on Oct. 30, 1962. It has also been proposed to distort the coils in the conventionally formed coil spring out of the normal plane before assembly, examples of this type of construction being disclosed in British Patent No. 107,422 issued on June 28, 1917; U.S. Patent No. 2,610,846 issued to J. C. Hanna on Sept. 16, 1952 and U.S. Patent No. 3,183,010 issued to G. E. Bram on May 11, 1965.

In all of this known prior art in which the coils of a conventionally coiled spring are distorted at assembly, i.e., after the initial coiling out of their normal plane, it was found that the force of the spring and the pressure exerted by each individual coil could not be effectively controlled but would vary greatly with the amount of distortion with the result that the action of the spring as a whole is non-uniform. Usually the effective force exerted by the spring varies considerably over the entire deflection range. Such springs are thus not entirely suited for use in applications such as bearing preload and seal retaining applications which require a controlled and substantially constant load over a wide range of deflection. Also, distortion of the coils of the conventionally coiled spring involves the risk of overstressing the coils or portions of the coils so that they take a permanent set thus destroying the desired spring characteristics. Problems have also been encountered with dimensional instability in such units.

Many of these problems have been overcome by the spring disclosed and claimed in the applicant's aforesaid U.S. Patent No. 3,323,785. This annular spring includes coils inclined with respect to the coiled axis of the spring so as to resiliently resist loads applied axially relative to the spring's annular axis. This spring provides only a relationship of constant load or force over a limited range of deflection and does not provide for the handling of radially applied loads. Since this patent does not teach that the coils should have segments of distinct constant radii and the precisely formed profile angles of the present invention, its load-deflection characteristics are not predictable with any degree of certainty.

With the foregoing considerations in mind, it is a principal purpose and object of the present invention to provide improved springs which overcome the above-stated disadvantages of the prior devices and which are of broader utility and provide a wider range of useful application than heretofore obtainable.

It is a further object of the present invention to provide improved coil spring constructions in which a wide variety of highly predictable load-deflection characteristics can be obtained to permit tailoring of the springs to the requirements of a wide variety of installations.

Another object is to provide an annular coil spring capable of providing a substantially constant load characteristic throughout a broad deflection range.

A still further object is to provide improved annular coil spring constructions capable of providing with a high degree of predictability of wide variety of load-deflection characteristics when loaded transversely of the coiled axis, the load direction being either axial or radial relative to the annular axis of the spring.

Yet another object is to provide improved coil springs for transverse loading which are relatively inexpensive, possess long life without failure or deterioration, provide predictable and even pressure, successfully withstand temporary overload conditions, and automatically accommodate the effects of wear on the mating members.

Briefly stated, in carrying out the invention in one form, a coil spring for transverse loading is comprised of a series of connected identical coils. Each of the coils has a first portion of constant radius and a second portion of constant smaller radius smoothly merged into each other. The second portions have identical angular extents of more than 180° and are disposed such that the load contact points are located in the second portions, the second portions intermediate the load contact points having identical profile angles of substantially 37½° and the coil portions intermediate the load contact points of adjacent coils having identical profile angles of substantially 60°. By further aspects of the invention, the coil spring may be arranged in annular form for transverse loading either axially or radially with respect to the spring's annular axis. By a still further aspect of the invention, the spring index, which is the ratio of the mean diameter of the second portion to the diameter of the wire, may be varied to provide a broad range of load-deflection characteristics, including a substantially constant load characteristic. The profile angles are fixed independently of the spring index.

Additional objects and advantages will become apparent as the description proceeds in connection with the accompanying drawings, in which:

FIGURE 1 is a plan view of a coil spring constructed in accordance with the present invention in linear form;

FIGURE 1 is a side elevation of the spring of FIGURE 1 showing a typical load application;

FIGURE 3 is a fragmentary enlarged view of a portion of the spring as shown in FIGURE 2;

FIGURE 4 is an enlarged fragmentary view looking in the direction of the arrows 4—4 in FIGURE 3 illustrating the position of the center points of the two portions of the individual spring coils;

FIGURE 5 is a top plan view of the spring of the type shown in FIGURE 1 but arranged in annular form;

FIGURE 6 is a side elevation of the spring in FIGURE 5;

FIGURE 7 is a plan view of a spring of the present invention particularly adapted for installation to accept radial loads;

FIGURES 8 and 9 are load vs. deflection graphs indicating the performance characteristics of springs of the present invention at different index values.

Figure 9:
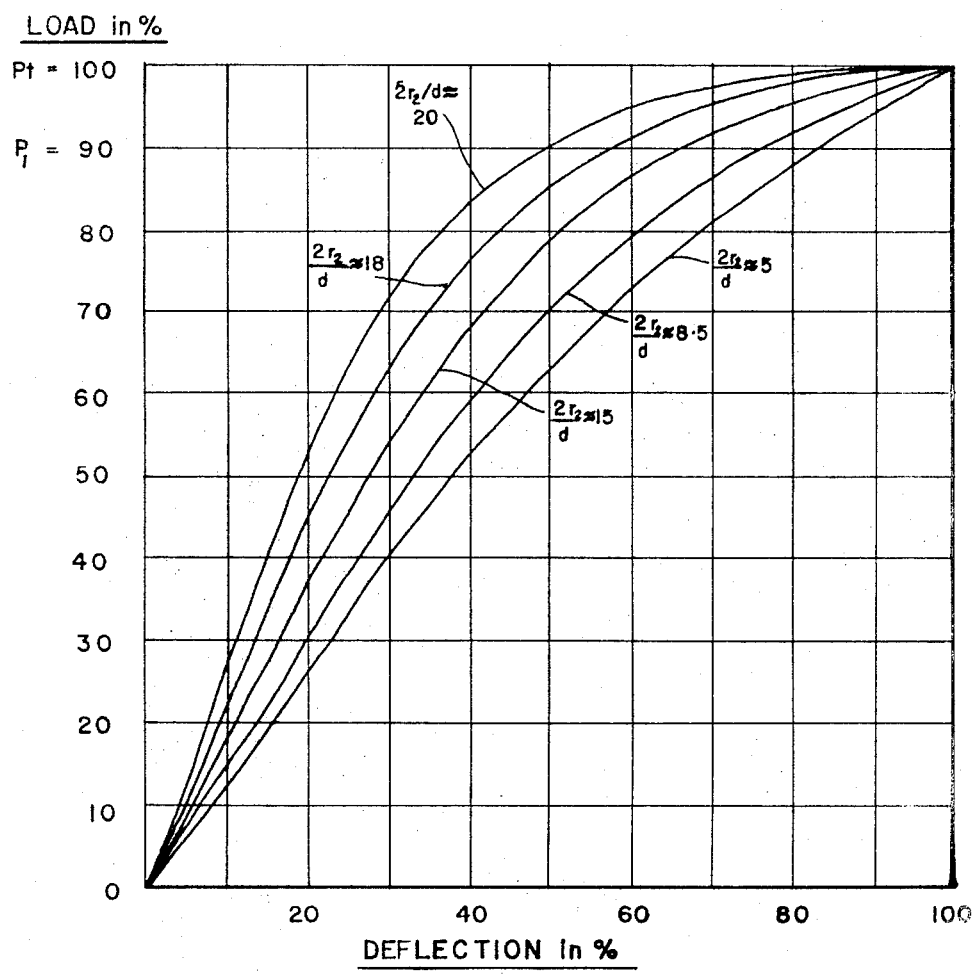

In all cases, the springs as originally formed are essentially linear, i.e., of the form shown in FIGURES 1 and 2. After being so formed, the springs may be bent about their longitudinal or coiled axes and the ends joined by welding to form a unitary annulus.

When the springs are bent in the plane of FIGURE 1, the resulting annulus 10 is of the configuration shown in FIGURES 5 and 6 and is particularly adapted for loading in the direction of the axis 12 of the annulus 10. When the springs are bent in a plane normal to the plane of FIGURE 1, the resulting annulus 14 is of the form shown in FIGURE 7 and is particularly adapted for loading in a direction normal to the axis 16 of the annulus 14.

The construction and configuration of the spring is best shown by FIGURES 3 and 4 to which detailed reference will now be made. The spring comprises a length of spring wire 20 formed into a connected series of identical coils 24, the configuration of the coils and their disposition with respect to the central spring axis 22 about which they are coiled being of particular importance in the achievement of the improved spring performance referred to above. For present purposes, one coil will be considered as that portion of the spring wire which lies between adjacent corresponding points 26 and 28 of the spring.

As best shown by FIGURES 3 and 4, the coil 24 comprises a first portion 25 extending essentially between points 26 and 30 which, as originally formed, has a first constant means radius of curvature $r_1$ and a second portion 27 extending essentially between points 30 and 28 which, as originally formed, has a second constant mean radius of curvature $r_2$ smaller than the radius $r_1$, the two constant radius portions 25 and 27 smoothly merging into each other in a relatively short transition portion 29 of varying radii in the area of point 30. The center of the first portion 25 is at 32 offset from the coiled axis 22 while the center of the second portion 27 is at 34 closely adjacent the coiled axis 22. The first, or large radius, portion 25 of the coil 24 is smoothly merged into the small radius portion of the adjacent coil by a relatively short transition portion 31 in the area of point 26, and the second, or small radius, portion 27 is smoothly merged into the large radius portion of the adjacent coil by an identical short transition portion 31 in the area of point 28.

As indicated above, all of the coils 24 comprising the spring are of identical form such that all of the first portions 25 have identical constant mean radii $r_1$ and identical angular extents as indicated by the angle A between lines 32–26 and 32–30 and all of the second portions 27 have identical constant means radii $r_2$ and identical angular extents as indicated by the exterior angle B between lines 34–28 and 34–30. In a typical case, angle A is approximately 90° and angle B is approximately 270°. While these angles can very within reasonable limits, it is essential to the present invention that the angle B be at least 180° so that the diametrically opposed load contact points 40 and 42 of each coil 24 are both located on the second, small radius portion 27. As will become obvious as this description proceeds, a load applied to the spring, whether in the annular form illustrated by FIGURES 5–7 or in the straight form of FIGURES 1–2, engages only the points 40 and 42.

To this point, the spring has been described as being formed of a number of connected coils 24 each having a first portion 25 of large mean radius $r_1$ and a second portion 27 of small mean radius $r_2$. It will also be appreciated that the spring can be described as having portions located between the load contact points 40 and 42. More particularly, the portion 44 between the load contact points 40 and 42 of a single coil 24 is of constant mean radius $r_2$, the portion 44 actually being a major fraction of the second portion 27. Similarly, the portion 46 between the points 40 and 42 of adjacent coils 24 is of varying radii, the portion 46 actually being the entire first portion 25, the transition portions 29 and 31, and a minor fraction of the second portion 27. It is possible, as illustrated by FIGURE 3, to define and measure profile angles for the portions 44 and 46.

Referring to FIGURE 3, the portion 44 has a profile angle $a$ which, if desired, can be approximately verified by measuring the transverse dimension $h$ between the points 40 and 42 and the axial dimension 1 between the 40 and 42 of the same coil 24 and then utilizing these measurements trigonometrically to determine the angle. Similarly, the portion 46 has a profile angle $b$ which can be approximately verified by measuring the transverse dimension $h$ and the axial dimension $1'$ between the points 40 and 42 of adjacent coils and then determining the angle $b$ from these measurements. In practice, it has been found that angle $a$ is ideally 60° and that angle $b$ is ideally 37½°. While it is, of course, possible for these angles to vary somewhat from these ideal values, the angle $a$ should remain within the range of 50° to 65°. If the angle $a$ exceeds 65°, there is a possibility that a load applied to points 40 and 42 may not cause resilient deflection, but rather cause buckling in the portion 44. On the other hand, if the angle $a$ is less than 50°, the transverse dimension $h$ will be greatly reduced and thus extremely limit the maximum possible deflection. Angle $b$ should similarly remain within a range of 30° to 45°. It will, of course, be obvious to those skilled in the art that variation in either one of the angles $a$ and $b$ necessarily requires an accompanying variation in the other angle since the transverse dimension $h$ must remain constant from coil to coil.

It has been found that the angles $a$ and $b$ should be within the above ranges, preferably at the ideal angles of 60° and 37½°, for all applications, regardless of the size and capacity of the spring or the value of the spring index. The spring index is defined to be the ratio of the mean diameter ($2r_2$) of the second portion 27 of the coil 24 to the diameter ($d$) of the wire 20. Although the angles $a$ and $b$ are identical for all spring indices, it will soon be appreciated that the spring constructions of this invention are capable of providing a wide variety of load-deflection characteristics through suitable selection of the value of the spring index.

It is to be particularly noted that the spring thus far described and illustrated by FIGURES 3 and 4 is in its "as coiled" state and is in its unloaded condition and in this respect is significantly different from many springs of the prior art which are formed in conventional fashion and then permanently distorted.

Insofar as present applications of the spring are known, they are always installed so the load is applied to the load contact points 40 and 42 in the transverse direction of the arrow L in FIGURES 2 and 3. When the load is so applied, the deflection of the spring involves principally the twisting of the shorter radius portion 27 in the vicinity of the load contact points 40 and 42 with an action similar to that of a torsion bar. This twisting action is accompanied by relatively little bending even under extreme deflection, and it is believed that many of the improved performance factors of the spring are attributable to this action. The stress pattern in this spring is quite complex, involving both shear and bending stresses. These stress characteristics will be described in greater detail as this specification proceeds, particularly with respect to FIGURE 10.

At present, it is expected that the spring of the present invention will have its greatest utility in the annular form shown in FIGURES 5 and 6 in which configuration it is capable of unique performance under loads applied axially of the annulus 10 into which it is formed.

As stated above, the annulus 10 of FIGURES 5 and 6 is formed by bending a linear spring as shown in FIGURE 1 in the plane of FIGURE 1. The ends of the spring are then permanently joined as by a weld 36. Preferably this weld is made near the midpoint of one of the first portions 25. This location is preferred since it is a point of minimum stress and also because it is not in contact with the surfaces against which the spring acts, contact occurring only at points 40 and 42. Stress analysis has also indicated that maximum shear stress occurs at the inside edges 50, or midpoints of the second portions 27.

The spring of FIGURE 7, which is particularly adapted for handling radial loads, is formed by bending a linear spring as shown in FIGURE 1 in a plane normal to the plane of FIGURE 1 and joining the ends in the manner described previously. When the spring is so formed, radial loads are applied to the contact points 40 and 42 in the direction of the arrows L in FIGURES 3 and 7 and again the deflection of the spring involves principally the torsion bar-like twisting of the second portions 27 of the coils.

It will be noted that whether the spring is in the form of FIGURES 5 and 6 and loaded axially or in the form of FIGURE 7 and loaded radially, the load points 40 and 42 are in contact with the load applying members.

With the profile angles $a$ and $b$ fixed in the manner described above, the performance of the annular springs of FIGURES 5–7 can be varied widely to suit the requirements of widely varying types of applications. Of particular importance is the fact that the load-deflection characteristics can be varied widely by varying the spring index, which has been defined above as $2r_2/d$.

The load-deflection characteristics of springs of the type shown in FIGURES 5–7 having various spring indices are illustrated by FIGURES 8 and 9. As there shown, a relatively low index of 10 or less produces essentially linear load-deflection performance over the entire range of deflection. As the valve of the spring index is increased, the spring has a substantial operating range in which load is essentially constant over a wide range of deflection. At a spring index of 20 or more, the range covers the entire range of 50% to 100% deflection $P_1$, the load causing 50% deflection at a spring index of 20, being 90% of $P_t$, the load causing 1000 deflection. In many installations, the spring will operate entirely within this substantially constant range, the spring and the associated parts being so constructed that, upon installation, the spring will be preloaded sufficiently to bring it into the constant load-deflection area of performance. A spring having this characteristic is particularly useful, for example, in maintaining a constant load on a seal member when the seal member is installed on a shaft or is otherwise located between relatively movable parts. A spring having this characteristic will also eliminate the need for constant adjustment to accommodate the effects of wear while still providing essentially constant force. It is also important to note that the action of the spring is uniform around its periphery. When the ring is loaded, each coil stores the same amount of energy which, when released, exerts uniform pressure around the ring.

Figure 10:
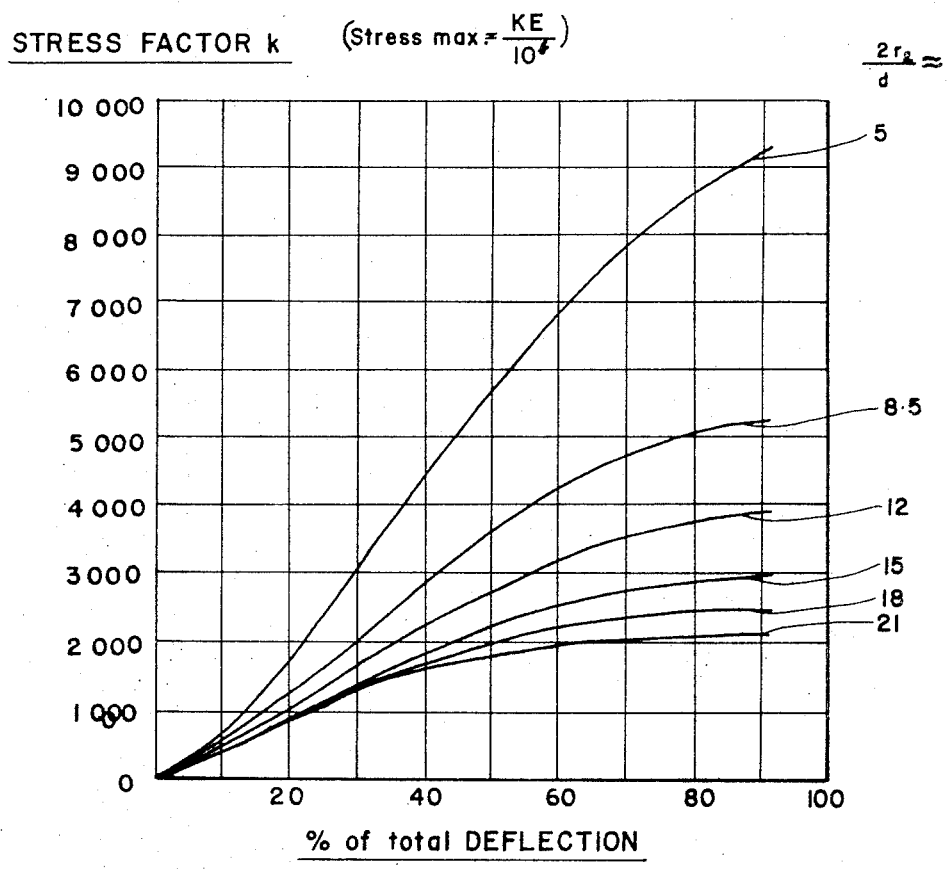
FIGURE 10 is a sheer stress vs. deflection graph indicating the sheer stress characteristics at different index values.

With reference now to FIGURE 10, the shear stress-deflection characteristics of springs having various spring indices are illustrated. A high stress factor K indicates a high level of shear stress. It will be appreciated from this figure that springs having spring indices of 20 or more and thus an essentially constant load characteristic also have relatively low shear stresses and correspondingly long lives.

By carefully maintaining the profile angles $a$ and $b$ at the proper fixed values and the radii $r_1$ and $r_2$ at the desired values, it is possible to predict accurately the performance of annular springs made in accordance with the present invention. More particularly, it has been found that springs made in accordance with the present invention have characteristics defined as follows:

$$p = 1.26 r_2$$

$$N = \frac{OD + ID}{0.802 r_2}$$

$$h_s \approx 3d$$

and $$P_t = \frac{E d^4 (OD + ID)}{635 r_2^3}$$

where:

E is Young's Modulus, $(30 \cdot (10)^6$ p.s.i. for steel)
p is pitch of coils
N is total number of coils
$h_s$ is solid height (100% deflection)
$P_t$ is total solid load
$r_2$ is mean radius of small radius portion
OD is outside diameter of annulus
ID is inside diameter of annulus
d is wire diameter.

If the spring is made of steel wire, the capacity equation reduces to:

$$P_t = \frac{4.72 (10)^4 d^4 (OD + ID)}{r_2^3}$$

What is claimed as new and is desired to secure by Letters Patent is:

1. A coil spring for loading in a predetermined direction transverse to its coiled axis, said coil spring comprising a series of connected identical coils each having a first portion of constant radius and a second portion of constant smaller radius smoothly merged into each other and the adjacent portions of the connected coils by relatively short transition portions, said second portions having identical angular extents of more than 180° and being disposed such that the diametrically opposed load contact points of each coil along the predetermined load direction are located in said second portions, said second portions intermediate said load contact points having identical second profile angles within the range of 50° to 65° and the spring portions including said first and transition portions intermediate the adjacent load contact points of connected coils having identical first profile angles within the range of 30° to 45°, said first and second profile angles being selected within said ranges such that all coils have an identical transverse dimension between their diametrically opposed load contact points.

2. A coil spring as defined by claim 1 in which said spring is in annular form and is arranged for loading in the direction of the axis of said annulus, said load contact points being located on axially opposite faces of said spring relative to the axis of said annulus.

3. A coil spring as defined by claim 2 in which said spring is an annular form and is arranged for loading in directions normal to the axis of said annulus, said load contact points being located on radially opposite faces of said spring relative to the axis of said annulus.

4. A coil spring as defined by claim 1 in which said first profile angles are substantially 37½° and said second profile angles are substantially 60°.

5. A coil spring as defined by claim 4 having a substantially constant load characteristic over the range of substantially 50% to 100% deflection, said coil spring having a spring index $(2r_2/d)$ of at least 20, "$2r_2$" being the mean diameter of said second portion and "$d$" being the diameter of the wire forming said coil spring.

6. A coil spring as defined by claim 4 in which said spring is in annular form, and in which said spring is further characterized by:

$$P = 1.260 r_2$$

$$N = \frac{OD + ID}{0.802 r_2}$$

$$h_s \approx 3d$$

and $$P_t = \frac{E d^4 (OD + ID)}{635 r_2^3}$$

where:

P is pitch of coils
N is total number of coils
$h_s$ is solid height
$P_t$ is total solid load
$r_2$ is mean radius of the second portion
OD is outside diameter of the annulus
ID is inside diameter of the annulus
d is wire diameter
E is Young's Modulus, $(30 \cdot (10)^6$ p.s.i. for steel)

7. A coil spring as defined by claim 6 having a substantially constant load characteristic over the range of substantially 50% to 100% deflection, said coil spring having a spring index $(2r_2/d)$ of at least 20.

8. A coil spring as defined by claim 6 having a substantially linear load characteristic over its entire range of deflection, said coil spring having a spring index $(2r_2/d)$ of less than 10.

9. A coil spring as defined by claim 6 in which:

$$P \geq 0.90 P_t$$

where:

P is the load producing substantially 50% deflection.

10. A coil spring as defined by claim 9 in which said spring is arranged for loading in the direction of the axis of said annulus, said load contact points being located on axially opposite faces of said spring relative to the axis of said annulus.

11. A coil spring as defined by claim 9 in which said spring is arranged for loading in directions normal to the axis of said annulus, said load contact points being located on radially opposite faces of said spring relative to the axis of said annulus.

12. A coil spring for loading in a predetermined direction transverse to its coiled axis, said coil spring comprising a series of connected identical coils each having a first portion of constant radius and a second portion of constant smaller radius smoothly merged into each other and the adjacent portions of the connected coils by relatively short transition portions, said second portions having identical angular extents of more than 180° and being disposed such that the diametrically opposed load contact points of each coil along the predetermined load direction are located in said second portions.

References Cited

UNITED STATES PATENTS

| | | | |
|---|---|---|---|
| 2,154,275 | 4/1939 | Linn | 267—1 |
| 3,183,010 | 5/1965 | Bran | 277—235 |

JAMES B. MARBERT, Primary Examiner

U.S. Cl. X.R.

277—235

PO-1050
(5/69)

UNITED STATES PATENT OFFICE
CERTIFICATE OF CORRECTION

Patent No. 3,468,527          Dated September 23, 1969

Inventor(s) GLENN E. MATHER

It is certified that error appears in the above-identified patent and that said Letters Patent are hereby corrected as shown below:

Column 3, line 25, change "of" (second occurrence) to -- a --

Column 4, line 64, change "very" to -- vary --.

Column 6, line 28, after "load" insert -- contact --.

Column 6, line 42, change "valve" to -- value --.

Column 6, line 48, change "1000" to -- 100% --.

Column 7, line 5, change "p = $1.26r_2$" to -- p = $1.260r_2$ --.

Column 7, line 58, change "an" to -- in --.

SIGNED AND
SEALED
SEP 29 1970

(SEAL)
Attest:

Edward M. Fletcher, Jr.
Attesting Officer

WILLIAM E. SCHUYLER, JR.
Commissioner of Patents